United States Patent Office 3,436,278
Patented Apr. 1, 1969

3,436,278
GLYCOL SOLDERING FLUXES
Richard M. Poliak, Johnson City, N.Y., assignor to International Business Machines Corporation, Armonk, N.Y., a corporation of New York
No Drawing. Filed Aug. 8, 1966, Ser. No. 570,752
Int. Cl. B23k 35/36
U.S. Cl. 148—23
2 Claims

ABSTRACT OF THE DISCLOSURE

A fluxing composition having particular value in soldering electrical connections and characterized by good adherence and easy removal of flux residue without corrosion, comprising from about 0.5 to 5% by weight of glutamic acid hydrochloride, from about 32% to 69% by weight of a polyglycol solvent selected from the group consisting of polyethylene glycol, polypropylene glycol and their mixtures and the balance water. An alkyl alcohol diluent for the solvent may be added in an amount of from about 19% to 25% by weight. Isopropyl alcohol is preferred. A minor amount of urea may also be added to supplement the glutamic acid hydrochloride. In place of the polyglycol solvent, from about 5% to 45% by weight of a polyoxyalkylene ether may be used.

---

This invention relates to glycol soldering fluxes and more particularly to compositions containing various polyglycols and glycol resins.

In soldering electrical connections it is usually necessary to employ fluxes to clean the metal being soldered and more importantly to prepare the surface of such metal for good adherence. To be effective, fluxes have to be useful and operative at the soldering temperature employed. Flux residue has to be easily removable and/or non-corrosive to metal contacts being soldered.

Prior art fluxes employed for such applications had the disadvantage of a narrow useful temperature range, a frequently corrosive effect on the contact metal, especially when left as a residue and because of their drying effect when employing alkyl alcohols, a danger to the skin or hands of the assembly line operators.

This disadvantage of the prior art has now been overcome by the use of a polyglycol as solvent, since it is non-hygroscopic and properties especially useful with an activating agent, such as an amino acid. Specifically, the broad useful temperature range of the polyglycol solvent of 300–600° F., is of special interest since it can be employed as a flux in various types of soldering operations within said broad temperature range. Since the useful temperature range of these polyglycol solvents is higher, i.e., the flashpoint is higher than solvents employed in the prior art, there is less of a chance for the premature evaporation of such fluxes, even under prolonged exposure conditions on an assembly line. The often frustrating corrosion problems of the prior art also solved by these polyglycol compositions, since the residue of these substances, after a soldering operation may be easily washed away by the use of water. Thus, entrapment of undesirable contaminants is largely eliminated. Even if some residue were to remain, however, it would be of a non-corrosive kind and in non-corrosive quantities.

A further important factor in the use of these solvents is that operating personnel would be unaffected when skin or clothing were to come into contact with these polyglycol solvents, since said solvents are frequently used in cosmetic formulations, such as face and hand creams and thus are completely non-toxic.

It is, therefore, an object of this invention to produce a glycol soldering flux useful in soldering operations involving electrical connections, especially for miniaturized components.

It is a further object of this invention to employ a composition comprising an activating agent, a solvent or carrier and a wetting agent, if desired, in order to produce the superior compositions of this invention.

Other objects and advantages will be more apparent and the invention will be more readily understood from the following description.

Briefly, the broad requirements of an activating agent, solvent and wetting agent, if desired, can be satisfied by the following two compositions:

0.5–5% by weight of glutamic acid hydrochloride;
32–69% by weight of polyglycols including a combination of both polyethylene and polypropylene glycols; with
19–25% by weight of alkyl alcohols;
the balance of the composition being water.

The second composition contemplated contains:

0–5% by weight of glutamic acid hydrochloride;
5–45% by weight of a glycol resin, such as a lower polyoxyalkylene ether, e.g., P-15-200 glycol resin by Dow Chemical Company; P-15-200 is a polyoxyalkylene ether containing methyl side chains and terminal hydroxyl groups. The figure "200" following the "15" designates the viscosity of the material in centistokes at 100° F.;
20–45% by weight of an alkyl alcohol;
0–5% by weight of urea;
0–10% by weight of other acids within the range of carboxylic and hydroxy carboxylic acid; with
the balance, if any, of water.

In the first composition, polyethylene glycol along with isopropyl alcohol as a diluent are used as the solvents. Polyethylene glycol serves both as a carrier and a wetting agent giving improved flow characteristics and consistency as opposed to other solvents used heretofore. The activated glutamic acid hydrochloride is ideal since it is just powerful enough, without being overly so, for the instant flux composition. It etches to form a tenacious grip on the contact metals to be soldered, without needing any other well known additive, such as zinc chloride. It may, if desired however, be supplemented by minor amounts of urea. The composition is tailor made to meet high temperature soldering requirements, between 300–600° F., and to produce sound solid joints. Among its advantages are low evaporation rate, optimum solder filleting, avoidance of the segregation of solder on individual joints and superior lubricating properties when in contact with the moving parts of the ultimate machine. Finally, but very importantly, the residue of flux remaining after a soldering operation is water washable and removable.

The second soldering composition contains as its solvent system a combination of water, an alkyl alcohol and glycol resin, more specifically a lower polyoxyalkylene ether. Activation is by means of an amino acid, specifically glutamic acid hydrochloride. This activator may be supplemented by other activating agents such as urea, carboxylic acid and hydroxy carboxylic acid. The polyoxyalkylene ether having low hygroscopic properties and employed as the solvent or carrier is formulated into the flux to insure that water pickup would not occur in the flux residue following cleaning, so that the residue would remain non-conductive and non-corrosive. Polyoxyalkylene ethers are considered less hygroscopic than other solvents or carriers and display complete solubility in water over the temperature range appropriate for soldering operations, while at the same time they have a higher solvent power for organic diluents, such as, isopropyl alcohol, tertiary butyl alcohol or any of the chlorinated hydrocarbons than those employed in the prior art. Together with the other components, they are compatible and removable in water cleaning systems. This composition is useful in soldering applications where minimum residue and non-conductive surfaces after fluxing and soldering are desired.

In order to provide a better understanding of the details of this invention, following are several examples of the composition which are illustrative of the invention. These examples however, are by no means limitative and are merely presented here for help in describing the particular compositions involved.

EXAMPLE 1

| | Grams |
|---|---|
| Glutamic acid hydrochloride | 20 |
| Polyethylene glycol | 700 |
| Isopropyl alcohol | 180 |
| Citric acid | 5 |
| Water (distilled) | 80 |

EXAMPLE 2

| | Grams |
|---|---|
| Glutamic acid hydrochloride | 30 |
| Polyethylene glycol | 1470 |
| Isopropyl alcohol | 720 |
| Water (distilled) | 1350 |

EXAMPLE 3

| | Grams |
|---|---|
| Glutamic acid hydrochloride | 30 |
| Polyethylene glycol | 700 |
| Polypropylene glycol | 700 |
| Isopropyl alcohol | 720 |
| Water (distilled) | 1400 |

Note.—In the above examples the polyethylene glycols may be mixtures with other molecular weight polyethylene glycols, while the polypropylene glycol in Example 3 may be a combination with other molecular weight polypropylene glycols.

EXAMPLE 4

| | Grams |
|---|---|
| Glutamic acid hydrochloride | 2.2 |
| Polyoxyethylene ether | 26 |
| Isopropyl alcohol (technical grade) | 90 |
| Tertiary butyl alcohol | 10 |
| Urea | 1.1 |
| Glycolic acid (conc.) | 10 |
| Water (distilled) | 45 |

EXAMPLE 5

| | Grams |
|---|---|
| Glutamic acid hydrochloride | 4.4 |
| Polyoxymethylene ether | 200 |
| Urea | 2.2 |
| Water (distilled) | 20 |

This invention has, for the sake of simplicity, been described in terms of a limited number of materials and embodiments. The inventive concept however, is to be broader in that other compositions of a similar character may be employed as fluxing compositions. It is to be understood by those skilled in the art that various changes in proportions, quantities and even in the substances themselves may be made herein without departing from the spirit and scope of this invention.

What is claimed is:
1. A fluxing composition comprising:
   from about 0.5% to 5% by weight of glutamic acid hydrochloride,
   from about 32% to 69% by weight of a polyglycol solvent selected from the group consisting of polyethylene glycol, polypropylene glycol, and their mixtures, and
   the balance water.
2. The composition of claim 1 further comprising from 19% to 25% by weight of a diluent for said solvent selected from the group consising of isopropyl alcohol, tertiary butyl alcohol, and their mixtures.

References Cited

UNITED STATES PATENTS

| 2,801,196 | 7/1957 | Doerr | 148—23 |
| 2,880,126 | 3/1959 | Jordan et al. | 148—23 |

FOREIGN PATENTS

| 675,954 | 7/1952 | Great Britain. |

OTHER REFERENCES

The Iron Age, "Soldering Fluxes," December 1948, p. 33.

ALLAN LIEBERMAN, *Primary Examiner.*

U.S. Cl. X.R.

29—495; 75—94; 106—287